June 9, 1936.        C. C. FUERST         2,043,926
LEAK LIGHT PROTECTION
Filed Oct. 19, 1935
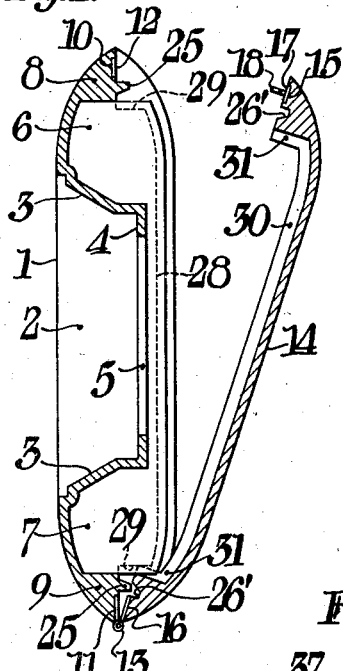
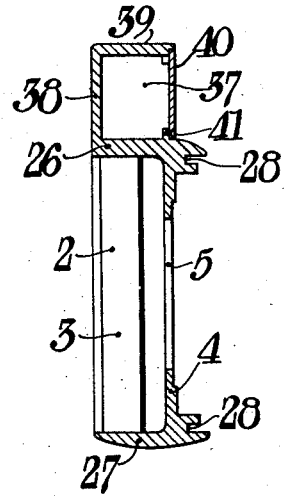
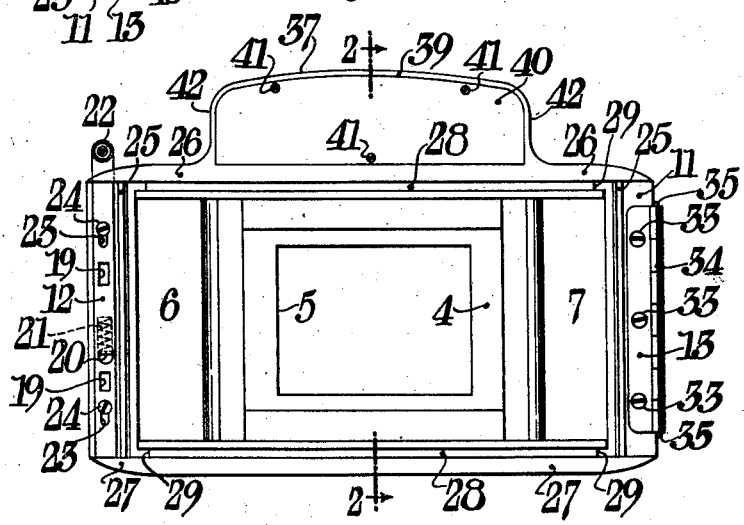
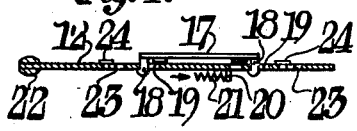
INVENTOR:
Carl C. Fuerst,
BY Newton M. Perrine,
Donald H. Stewart
ATTORNEYS.

Patented June 9, 1936

2,043,926

UNITED STATES PATENT OFFICE 2,043,926

LEAK LIGHT PROTECTION

Carl C. Fuerst, Rochester, N. Y., assignor to Eastman Kodak Company, Rochester, N. Y., a corporation of New York Application October 19, 1935, Serial No. 45,793

9 Claims. (Cl. 95—32)

This invention relates to photography and, particularly, to roll film photographic cameras. One object of my invention is to provide a camera of compact nature which can be readily made of moldable material. Another object of my invention is to provide a camera of the class described in which the walls are provided with relatively heavy portions to reinforce the camera body. Another object of my invention is to provide a camera body with a back so arranged that an adequate light-tight connection is made between the inside of the back and the camera body around the entire opening covered by the camera back. Another object of my invention is to provide a camera with spaced walls on which the camera latch and hinge may be so arranged that a light-tight joint can be made between the hinge and latch and the inside of the camera body. Still other objects will appear from the following specification, the novel features being particularly pointed out in the claims at the end thereof.

In making cameras of moldable composition, such as bakelite, cellulose acetate and other suitable moldable materials, it is difficult to provide for attaching metal parts, such as hinges, latches, etc., because while it is possible to thread bakelite to receive screws the holding power of the bakelite is considerably less than either metal or wood. It is also difficult to provide camera parts which are of a high degree of accuracy and consequently in which an adequate light-tight joint can be maintained. My present invention is particularly directed to overcome some of these known difficulties.

Coming now to the drawing wherein like reference characters denote like parts throughout, Figure 1 is a section through a camera body and back of a camera constructed in accordance with and embodying a preferred form of my invention, Figure 2 is a section taken on line 2—2 of Figure 3, Figure 3 is a rear elevation of the camera body shown in Figure 1 with the back removed.

Figure 4 is a detail part section and part elevation of the camera latch shown in the preceding figures.

In accordance with my invention, I may provide a camera body which can be made of a moldable composition, this camera body consisting of an integral molded part designated broadly as 1. It is provided with an opening 2 in the camera front, there being end walls 3 extending rearwardly to an exposure frame 4 in which there is an opening 5 through which exposures are made on a film. The walls 3 separate the central part of the camera body from the spool chambers 6 and 7 and the walls 8 and 9 forming the extreme ends of the spool chambers 6 and 7 are made of relatively thick material so that these walls may have flat surfaces 10 and 11 on which a camera latch 12 and a hinge 13 for the camera back 14 may be mounted.

The camera back 14 is likewise provided with a pair of flat walls 15 and 16 which, when the camera back is closed, are parallel to the walls 10 and 11. Wall 15 of the camera back is provided with a latch element 17 which includes a pair of hook-like members 18 adapted to engage in apertures 19 of the latch 12. The latch element 12 is provided with a downwardly formed lug 20 against which a spring 21 presses to hold element 12 in a latching position. When, however, the handle 22 is drawn outwardly compressing the spring 21, the hook elements 18 may be disengaged from the apertures 19 as the element 12 slides on the camera body, this sliding movement being permitted by the slots 23 and the pins 24.

It should be noted that the latch elements 12 and 17 are both included on the flat parallel facing walls 10 and 17 and that, while the latch elements are completely concealed, it is possible for light to enter between these walls. However, the light cannot pass the latch into the spool chamber 6 because of the interlocking light-tight flange and groove connection between the camera back 14 and the body 1 as will now be described.

Across the end of walls 10 and 11 a flange 25 projects outwardly from the face of the walls. These flanges are adapted to engage complementary shaped grooves 26' in the camera back 14 when the back is moved against the body. It should be noted that the flanges 25 extend entirely across the body of the camera and contact with the top and bottom walls 26 and 27 as best shown in Fig. 3.

The camera back is also provided with a groove 28 which extends along walls 26 and 27, these grooves being provided with shoulders as indicated at 29. The camera back 14 is provided with a corresponding flange 30 running the length of the camera back and with downwardly extending flanges 31. Thus, when the camera back is moved against a camera body a complete light-tight joint is formed around the inside of the walls of the camera body and back.

This construction has a number of advantages among which is that the flat facing parallel walls of the camera back and body provide a place for the camera latch and the camera hinge and provide suitable seats in which these metallic parts can be mounted, it being unnecessary to make these portions of the camera light-tight.

As indicated in Fig. 3, the hinge 13 may be held on the flat wall 11 by screws 33. The screws and all of the hinge except that part 34 which supports the hinge pintle are entirely enclosed by the walls of the camera and thus the camera presents a neat appearance.

This is also true of the latch elements 12 and 17, since only the latch operating handle 22 projects beyond one wall 26 of the camera being otherwise totally enclosed.

As indicated in Fig. 2, one camera wall 26 may be provided with an upper extension 37 to form an enclosure for a range finder. The front of the camera may be provided with an upwardly projecting wall 38 which is formed rearwardly at 39 so that the extension 37 will provide a housing when a covered plate 40 is attached by means of screws 41 as indicated in Figs. 2 and 3. As also indicated in Fig. 3, the end walls 42 of the extension 37 may terminate short of the ends of the camera and may be made to curve downwardly into the wall 26 as shown.

With a camera constructed in accordance with the above described embodiment of my invention, the camera body can be made very strong since the thickness of the camera walls and back are materially increased at the ends of the camera where the liability of breakage is greatest. As above described, it is also possible to enclose and obscure the relatively heavy hinge and latch parts which are preferable with this type of a camera. Still more important from the photographic standpoint is the adequate light lock which completely encloses the opening in the camera body through which a light sensitive film passes. Since this light-tight connection lies adjacent the film enclosing structure of the camera body and camera back it is in the most desirable and effective location.

While I have described a preferred embodiment of my invention many changes can be made from the illustrated structure without departing from my invention, and I consider, as within the scope of my invention, all such forms as may come within the terms of the appended claims.

What I claim as my invention and desire to secure by Letters Patent of the United States is:

1. In a camera, the combination with a camera body having spool chambers at each end and an opening at the back exposing the spool chambers, of a camera back adapted to close the opening, the camera back and body including a pair of parallel flat walls facing each other and extending beyond the spool chambers, means for attaching the camera body and back supported by said flat walls and complementary shaped interengaging members on the camera body and back for preventing light from entering into the spool chambers.

2. In a camera, the combination with a camera body having spool chambers at each end and an opening at the back exposing the spool chambers, of a camera back adapted to close the opening, the camera back and body including a pair of parallel flat walls facing each other and extending beyond the spool chambers, means for attaching the camera body and back supported by said flat walls and complementary shaped interengaging members on the camera body and back, said interengaging members including side members on the camera back and body connecting the ends of the first mentioned interengaging members, whereby light is prevented from entering between the camera body and back.

3. In a camera, the combination with a camera body having spool chambers at each end and an opening at the back exposing the spool chambers, of a camera back adapted to close the opening, the camera back and body including a pair of parallel flat walls facing each other and extending beyond the spool chambers, means for attaching the camera body and back supported by said flat walls, comprising a hinge attached to the parallel flat walls on the camera back and body at one end, flange and groove connections between the camera back and body and included in the parallel abutting surfaces of the camera back and body for preventing light from passing through the hinge into the spool chamber.

4. In a camera, the combination with a camera body having spool chambers at each end and an opening at the back exposing the spool chambers, of a camera back adapted to close the opening, the camera back and body including a pair of parallel flat walls facing each other and extending beyond the spool chambers, means for attaching the camera body and back supported by said flat walls, comprising a hinge attached to the parallel flat walls on the camera back and body at one end, flange and groove connections between the camera back and body and included in the parallel abutting surfaces of the camera back and body, and also flange and groove connections in the body and back extending transversely of and connecting the first mentioned flange and groove connections for making a light tight joint between the camera body and back.

5. In a camera, the combination with a camera body having spool chambers at each end and an opening at the back exposing the spool chambers, of a camera back adapted to close the opening, the camera back and body including a pair of parallel flat walls facing each other and extending beyond the spool chambers, means for attaching the camera body and back supported by said flat walls, comprising a hinge attached to the parallel flat walls on the camera back and body at one end, flange and groove connections between the camera back and body and included in the parallel abutting surfaces of the camera back and body, and also flange and groove connections in the body and back extending transversely of and connecting the first mentioned flange and groove connections for making a light tight joint between the camera body and back and latch elements carried by said flat parallel walls on the camera body and back opposite to the said hinge, said latch elements also being located adjacent the tongue and groove connection in the parallel walls and the camera body and back.

6. In a camera, the combination with a camera body, of a back hinged thereto at one end, a latch at the opposite end for holding the back closed against the body, and pairs of parallel flat walls at the ends of the camera body and back supporting the hinge and latch elements therebetween.

7. In a camera, the combination with a camera body, of a back hinged thereto at one end, a latch at the opposite end for holding the back closed against the body, pairs of parallel flat walls at the ends of the camera body and back supporting the hinge and latch elements therebetween, and flange and groove connections between the camera body and back, said connections extending between said flat pairs of parallel walls and between the inside of the camera and the hinge and latch elements.

8. In a camera, the combination with a camera body, of a back hinged thereto at one end, a latch at the opposite end for holding the back closed against the body, pairs of parallel flat walls at the ends of the camera body and back supporting the hinge and latch elements therebetween and a flange and groove connection between the camera back and body extending entirely around these parts, the connection extending across the ends of the camera on the inside edges of the parallel facing flat walls on the camera body and back.

9. In a camera, the combination with a camera body, having an opening for loading, of a back adapted to contact with the body and to be moved relative thereto for loading, the camera back and body each having light tight interengaging walls comprising a flange and groove connection between the parts, each part including also a relatively thick flat wall extending outside of the flange and groove connections, said thick flat walls of the camera body and back lying adjacent and parallel to each other.

CARL C. FUERST.